UNITED STATES PATENT OFFICE.

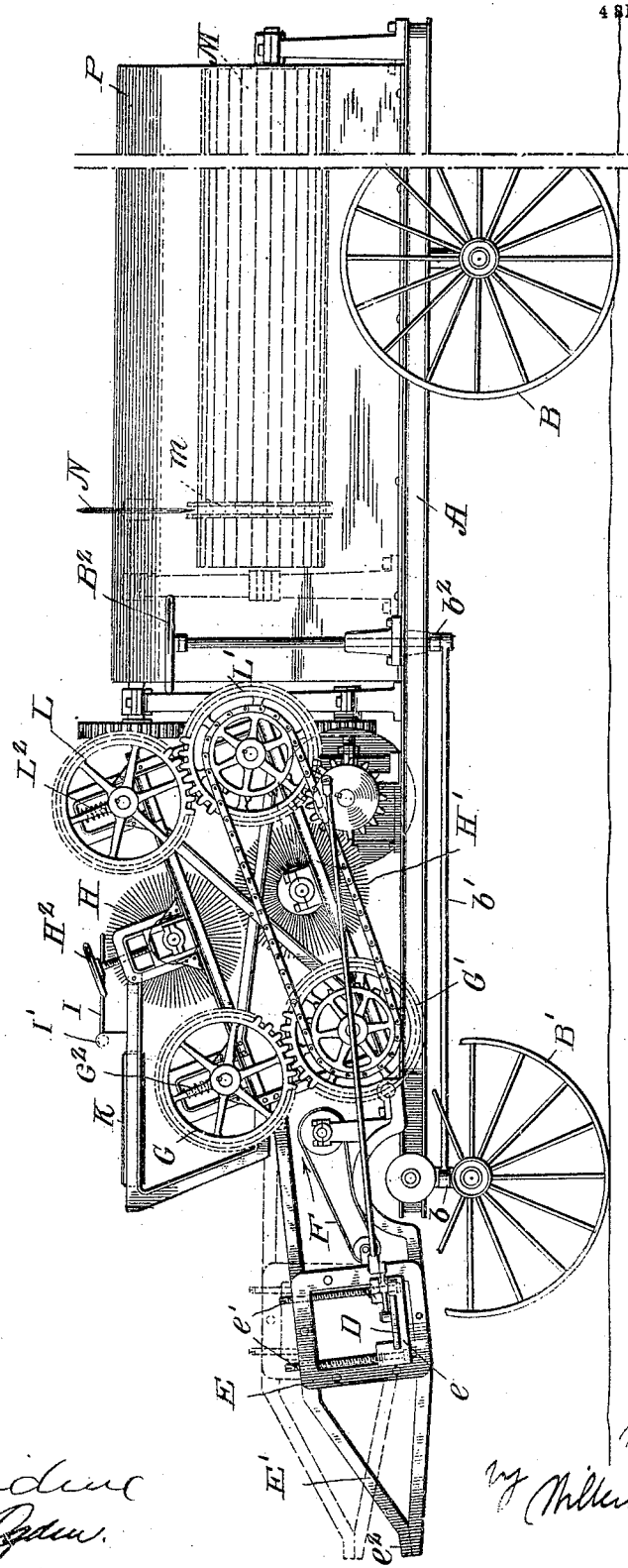

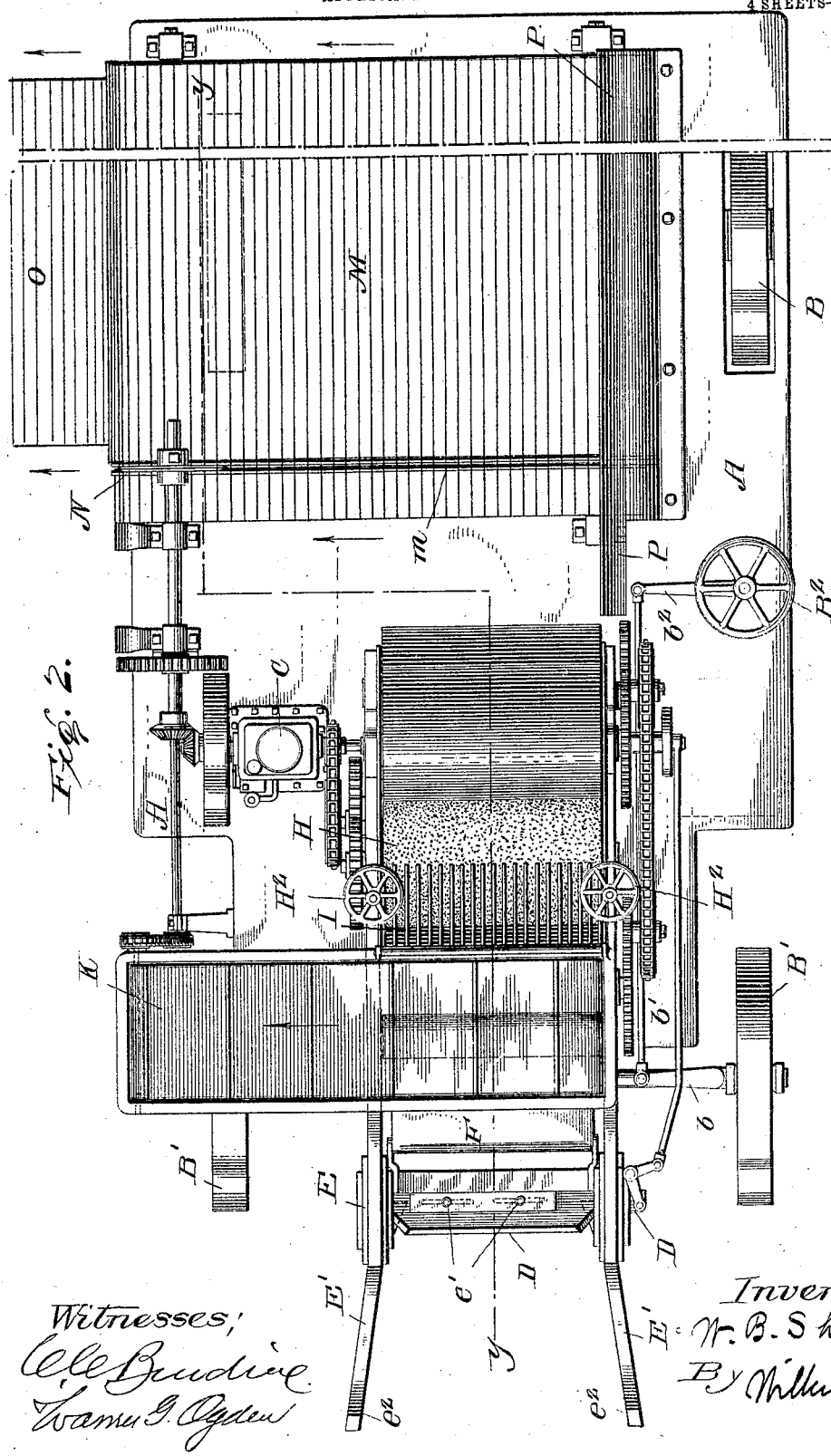

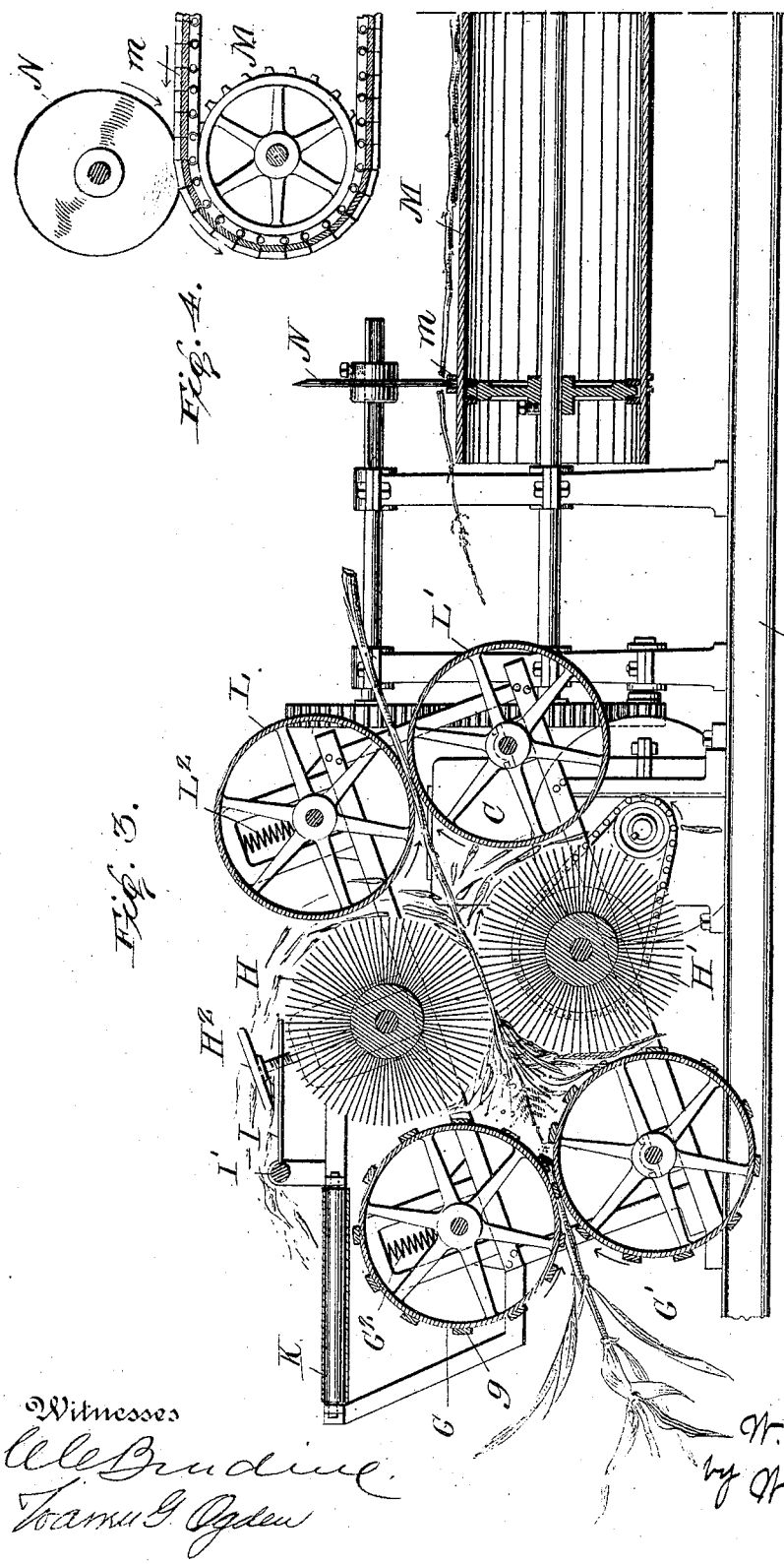

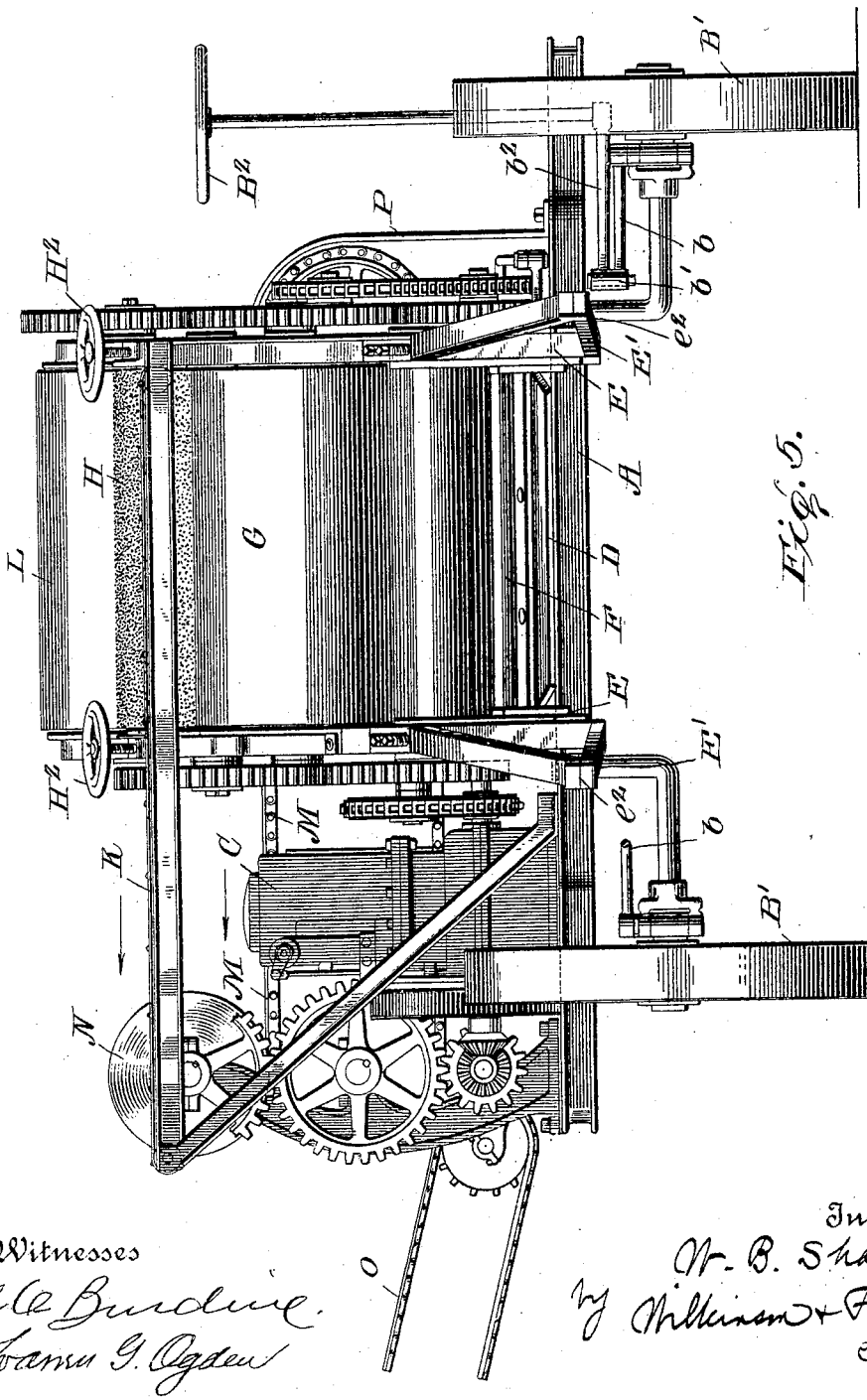

WILLIAM B. SHARP, OF NEW IBERIA, LOUISIANA.

CANE-HARVESTER.

No. 798,534. Specification of Letters Patent. Patented Aug. 29, 1905.

Application filed September 17, 1904. Serial No. 224,877.

*To all whom it may concern:*

Be it known that I, WILLIAM B. SHARP, a citizen of the United States, residing at New Iberia, in the parish of Iberia and State of Louisiana, have invented certain new and useful Improvements in Cane-Harvesters; and I do hereby declare the following to be a full, clear, and exact description of the invention, such as will enable others skilled in the art to which it appertains to make and use the same.

My invention relates to improvements in harvesters for the stalks of cane or corn in which it is desired to cut the stalks at or near the surface of the ground, to remove the leaves therefrom, whether dried or green, to chop off the tops of the stalks at a substantially uniform distance from the top, and to deliver the lower portions of the stalks to a wagon or other vehicle alongside of the machine.

The invention is adapted to remove the fodder from corn and to cut off the tender part of the cornstalk; but it is primarily intended for the harvesting of cane where it is desirable to clean the stalks of trash and to cut off the tops of the stalks low enough to remove the green portion at the top of the cane and yet not to waste any of the sweeter portion which is destined for the mill or diffusion apparatus.

Cane-stalks are of varying lengths; but the green portion to be removed is of substantially the same length irrespective of the total length of the cane-stalk, and therefore it is essential in an apparatus of this character to have the machine automatically operated to cut off the cane-stalk at substantially the same distance from the top irrespective of the varying lengths of the different stalks.

My invention will be more fully understood by reference to the accompanying drawings, in which the same parts are indicated by the same letters throughout the several views.

Figure 1 is a side elevation of the apparatus, the boiler and water-tank and certain other parts being omitted from the drawings. Fig. 2 is a plan view of the apparatus, omitting the boiler and water-tank. Fig. 3 shows a section along the line $y\ y$ of Fig. 2, showing the parts on a larger scale than in Fig. 2 and omitting certain of the parts for the sake of clearness in the drawings. Fig. 4 is a detail showing the operation of the rotary knife for cutting off the tops of the stalks; and Fig. 5 is a front elevation of the apparatus, the boiler and water-tank being omitted.

The apparatus is carried on a suitable platform A, mounted on traction-wheels B and front wheels B', which latter are mounted to be swung, as with ordinary motor-wagons, by means of a suitable system of levers and rods $b\ b'\ b^2$, controlled by the steering-wheel $B^2$. The vehicle and the various moving parts carried thereby are driven by any suitable engine C, which may be an explosion-engine or an ordinary steam-engine, as may be preferred, or any other suitable motor-power may be adopted, if desired.

D represents a suitable knife, which is mounted to reciprocate in the guides $e$, adjustably mounted in the frame E, as by means of the adjusting-screws $e'$. This frame E carries forwardly-projecting guards E', pointed, as at $e^2$, to pass down close to the ground between the rows of cane. These guards E' flare outward, as shown in Fig. 2, so as to guide the cane in toward the knife D. This frame E may be raised or lowered, as indicated in dotted lines in Fig. 1, so as to cut close to the ground irrespective of the height of the bed of the cane. It will be understood that cane-rows differ in height and the knife should be adjusted to cut close to the ground. After being cut by the knife D the bottom of the cane-stalk is caught on the apron F, the top falling over backward, and the stalks are dragged through the apparatus bottom foremost, as shown in Fig. 3. In this figure only a single stalk is shown between the rollers and one on the carrier; but there will ordinarily be a number of stalks at all times passing through the apparatus when in use. The apron F carries the bottom of the stalks to the feeding-rollers G G', which are not intended to mash the cane at all, but merely to feed it forward. To prevent injury to the cane while passing between these rollers, I may provide strips of rubber or leather or other yielding material, as indicated at $g$ in Fig. 3, and for the same purpose the coil-springs $G^2$ are provided in order to press the roller G down toward the roller G' with a yielding pressure. The rollers G G' feed the cane-stalks to the brushes H H', which rotate in the direction of the arrows. These brushes are preferably made of wire to strip off the trash from the cane and deliver part of it below the apparatus and part of it above the comb I, which is hinged at I' and rests lightly on top of the brush H. This comb cards the trash from the brush H and the latter falls on the apron K, which moves in the direction of the arrow (see Figs. 2 and 5) and deposits this trash to one side of the apparatus. The space between the rollers may be adjusted by means of the hand-wheel H² and an adjusting-screw connected thereto. After having the trash removed from the stalks by means of the brushes H H' the stalks pass on between the rollers L L', which are adjustably pressed together by means of the coil-springs L². Strips similar to the strips $g$ may be used on these rollers L L', if desired. The cane is pushed from these rollers L L' onto the endless carrier M, and is prevented from falling off to one side of said carrier by means of any suitable guard plate or piece P. This carrier carries the cane to the circular cutting-knife N, which is rotated near one edge of the carrier, as shown in Fig. 2. This cutting-knife projects down into a groove formed by a series of metal plates $m$, (see Figs. 2 and 4,) whereby a clean cut is made. The green ends of the stalk fall clear of the carrier O, which is mounted just below the carrier M and is not quite so wide as the carrier M, as shown in Fig. 2. This carrier O carries the lower end of the stalks to the cane cart or wagon, (not shown,) which is driven alongside of the harvester while the latter is in operation.

I have shown means for driving the several parts from the engine carried by the harvester; but any suitable gearing for the purpose may be adopted. As this is a mere matter of mechanical skill, I have not deemed it necessary to describe in detail the various gear-wheels, sprocket-chains, and other means of transmitting power which are shown in the drawings, as these details may be varied at will without departing from the spirit of my invention.

I do not mean to confine myself to the specific form of the various operating parts that constitute my invention, as these also may be varied in numerous ways; but

What I claim as new, and desire to secure by Letters Patent of the United States, is—

1. A movable cane or corn harvester, comprising means for cutting the stalks and delivering them to the apparatus butt foremost, two pairs of feed-rollers for drawing the same through the apparatus, stripping means located between the pairs of feed-rollers, and means for topping the stalks when stripped, substantially as described.

2. A movable cane or corn harvester, comprising means for cutting the stalks and delivering them to the apparatus butt foremost, two pairs of feed-rollers for drawing the same through the apparatus, one roller of each pair being yieldingly mounted with respect to the other, stripping means located between the pairs of feed-rollers, and means for topping the stalks when stripped, substantially as described.

3. A movable cane or corn harvester, comprising means for cutting the stalks and delivering them to the apparatus butt foremost, two pairs of feed-rollers for drawing the same through the apparatus, the surfaces of said rollers being provided with a yielding material, stripping means located between the pairs of feed-rollers, and means for topping the stalks when stripped, substantially as described.

4. A movable cane or corn harvester, comprising means for cutting the stalks and delivering them to the apparatus butt foremost, two pairs of feed-rollers for drawing the same through the apparatus, the surfaces of said rollers being provided with strips of rubber, stripping means located between the pairs of feed-rollers, and means for topping the stalks when stripped, substantially as described.

5. A movable cane or corn harvester, comprising means for cutting the stalks and delivering them to the apparatus butt foremost, two pairs of yieldingly-mounted feed-rollers for drawing the same through the apparatus, the surfaces of said rollers being provided with strips of rubber, stripping means located between the pairs of feed-rollers, and means for topping the stalks when stripped, substantially as described.

6. A movable cane or corn harvester, comprising means for cutting the stalks and delivering them to the apparatus butt foremost, two pairs of feed-rollers for drawing the same through the apparatus, a pair of rotary stripping-brushes located between the pairs of feed-rollers, and means for topping the stalks when stripped, substantially as described.

7. A movable cane or corn harvester, comprising means for cutting the stalks and delivering them to the apparatus butt foremost, two pairs of feed-rollers for drawing the same through the apparatus, a pair of adjustable rotary stripping-brushes located between the pairs of feed-rollers, and means for topping the stalks when stripped, substantially as described.

8. A movable cane or corn harvester, comprising means for cutting the stalks and delivering them to the apparatus butt foremost, two pairs of feed-rollers for drawing the same through the apparatus, a pair of rotary wire stripping-brushes located between the pairs of feed-rollers, and means for topping the stalks when stripped, substantially as described.

9. A movable cane or corn harvester, comprising means for cutting the stalks and delivering them to the apparatus butt foremost, two pairs of feed-rollers for drawing the same through the apparatus, a pair of rotary stripping-brushes located between the pairs of feed-rollers, means for carding said brushes of trash, and means for topping the stalks when stripped, substantially as described.

10. A movable cane or corn harvester, comprising means for cutting the stalks and delivering them to the apparatus butt foremost, two pairs of feed-rollers for drawing the same through the apparatus, a pair of rotary stripping-brushes located between the pairs of feed-rollers, means for carding said brushes of trash, means for removing said trash when carded, and means for topping the stalks when stripped, substantially as described.

11. A movable cane or corn harvester, comprising means for cutting the stalks and delivering them to the apparatus butt foremost, two pairs of feed-rollers for drawing the same through the apparatus, a pair of adjustable rotary wire stripping-brushes located between the pairs of feed-rollers, means for carding said brushes of trash, means for removing said trash, when carded, and means for topping the stalks when stripped, substantially as described.

12. A movable cane or corn harvester, comprising means for cutting the stalks and delivering them to the apparatus butt foremost, two pairs of feed-rollers for drawing the same through the apparatus, a pair of rotary stripping-brushes located between the pairs of feed-rollers, a comb for carding said brushes of trash, an endless carrier for removing said trash when carded, and means for topping the stalks when stripped, substantially as described.

13. A movable cane or corn harvester, comprising means for cutting the stalks and delivering them to the apparatus butt foremost, two pairs of feed-rollers for drawing the same through the apparatus, stripping means located between the pairs of feed-rollers, means for removing the trash from the apparatus, and means for topping the stalks when stripped, substantially as described.

14. A movable cane or corn harvester, comprising means for cutting the stalks and delivering them to the apparatus butt foremost, two pairs of feed-rollers for drawing the same through the apparatus, stripping means located between the pairs of feed-rollers, an endless carrier for removing the trash from the apparatus, and means for topping the stalks when stripped, substantially as described.

15. A movable cane or corn harvester, comprising means for cutting the stalks and delivering them to the apparatus butt foremost, an endless carrier moving crosswise of the vehicle, a knife mounted above the same, stripping means, and means for feeding the stalks through the apparatus and upon said carrier in front of said knife, substantially as described.

16. A movable cane or corn harvester, comprising means for cutting the stalks and delivering them to the apparatus butt foremost, an endless carrier moving crosswise of the vehicle, a knife mounted above the same, stripping means, means for feeding the stalks through the apparatus and upon said carrier in front of said knife, and a narrower carrier located below the first-named carrier and adapted to receive the main portions of the stalks but to allow the cut-off tops to fall clear of the same, substantially as described.

17. A movable cane or corn harvester, comprising means for cutting the stalks and delivering them to the apparatus butt foremost, an endless carrier moving crosswise of the vehicle, a series of grooved plates mounted on said carrier, a knife mounted above the carrier and projecting into the grooves in said plates, stripping means, and means for feeding the stalks through the apparatus and upon said carrier in front of said knife, substantially as described.

18. A movable cane or corn harvester, comprising means for cutting the stalks and delivering them to the apparatus butt foremost, an endless carrier moving crosswise of the vehicle, a series of grooved plates mounted on said carrier, a knife mounted above the carrier and projecting into the grooves in said plates, stripping means, means for feeding the stalks through the apparatus and upon said carrier in front of said knife, and a lower carrier of less width than the upper and adapted to receive the longer portions of the stalks but to allow the cut-off tops to fall clear of the same, substantially as described.

19. A movable cane or corn harvester, comprising means for cutting the stalks and delivering them to the apparatus butt foremost carried at the front end of the vehicle, two pairs of feed-rollers for drawing the stalks from said cutter, stripping means located between said pairs of feed-rollers, and an endless carrier moving crosswise of the vehicle located in rear of said feed-rollers, with means for cutting off substantially uniform lengths from the tops of the stalks carried by said endless carrier, substantially as described.

20. A movable cane or corn harvester comprising means for cutting the stalks and delivering them to the apparatus butt foremost carried at the front end of said vehicle, two pairs of feed-rollers for drawing the stalks from said cutter, stripping means located between said pairs of feed-rollers, an endless carrier moving crosswise of the vehicle located in rear of said feed-rollers, and a rotary knife mounted above said carrier near one edge thereof for cutting off the tops of said stalks, substantially as described.

21. A movable cane or corn harvester, comprising means for cutting the stalks and delivering them to the apparatus butt foremost carried at the front end of said vehicle, two pairs of feed-rollers for drawing the stalks from said cutter, stripping means located between said pairs of feed-rollers, an endless carrier moving crosswise of the vehicle located in rear of said feed-rollers, grooved plates secured on said carrier, and a rotary knife mounted above said carrier near one edge thereof and projecting into the grooves on said plates for cutting off the tops of said stalks, substantially as described.

22. A movable cane or corn harvester, comprising means for cutting the stalks and delivering them to the apparatus butt foremost carried at the front end of said vehicle, two pairs of feed-rollers for drawing the stalks from said cutter, stripping means located between said pairs of feed-rollers, an endless carrier moving crosswise of the vehicle located in rear of said feed-rollers, grooved plates secured on said carrier, a rotary knife projecting into the groove in said plates for cutting off the tops of the stalks carried by said endless carrier, and a lower carrier of less width than the upper carrier adapted to receive the main portion of the stalks, but to allow the cut-off tops to fall clear thereof, substantially as described.

In testimony whereof I affix my signature in presence of two witnesses.

WILLIAM B. SHARP.

Witnesses:
S. A. BENTHALL,
JOHN E. SCHWING.